April 29, 1958
E. E. SCHOESSOW
2,832,570
HEAT EXCHANGER
Filed Dec. 22, 1953
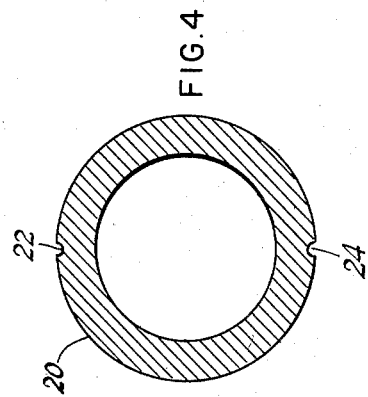
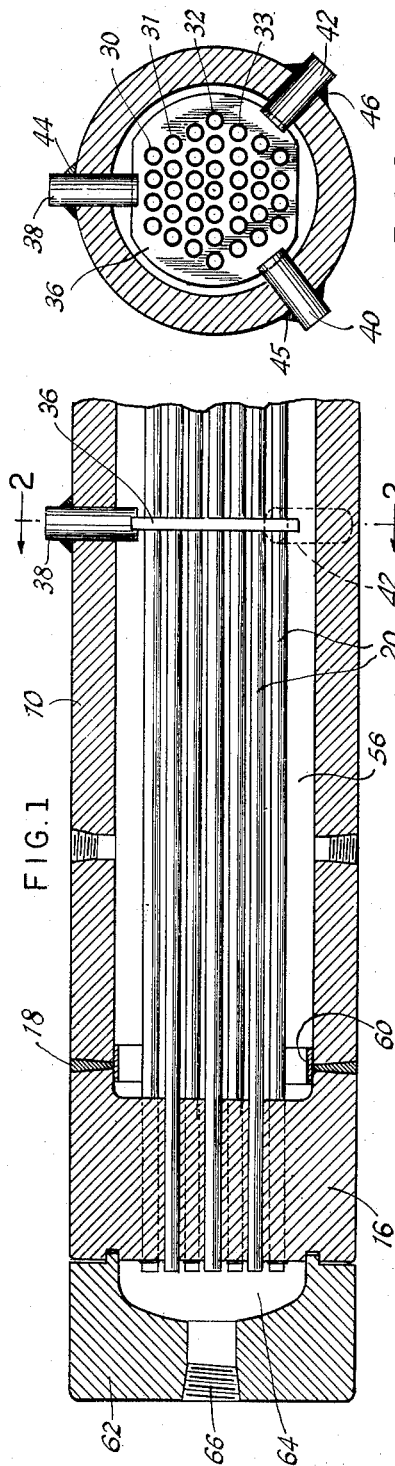
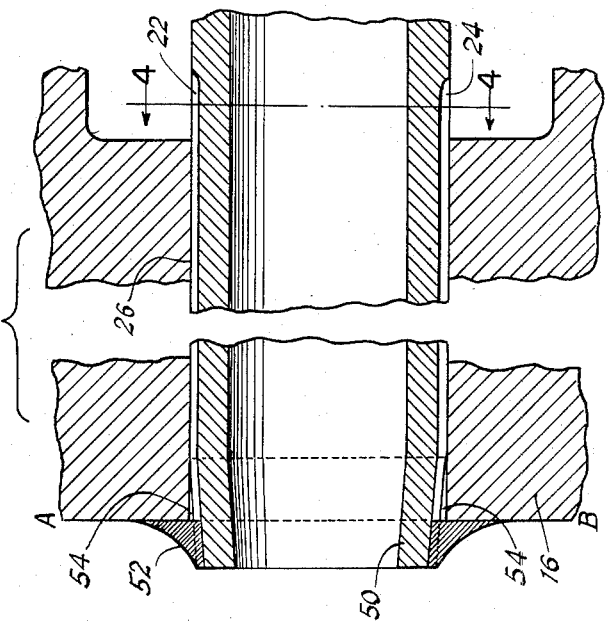
INVENTOR
Earl E. Schoessow
BY
W. Holbrook
ATTORNEY

United States Patent Office 2,832,570
Patented Apr. 29, 1958

2,832,570

HEAT EXCHANGER

Earl E. Schoessow, Barberton, Ohio, assignor to The Babcock & Wilcox Company, New York, N. Y., a corporation of New Jersey Application December 22, 1953, Serial No. 399,707

16 Claims. (Cl. 257—236)

This invention relates to fluid heat exchange apparatus subject to high fluid temperatures and/or high fluid pressures, in use, and a method of fabricating such apparatus.

In apparatus of the pertinent type, there is provided a pressure chamber with thick walls to permit the use of the apparatus with its pressure chamber subject to very high fluid pressure and/or temperature. One of such walls may be in the nature of a tube sheet having one or more circular bores known as tube seats, therein. Each tube seat has an end portion of a high pressure tube fitted and expanded therein. In most embodiments of the pertinent apparatus there is a plurality of such tubes fitted into corresponding tube seats in each tube sheet, and thereafter fixed in those positions by expanding the tubes in the tube seats. In some modifications the tube sheet may take the form of a header wall or a drum wall with a plurality of spaced tubes extending from the header through a gas pass zone to a similar header in which the opposite ends of the tubes are similarly joined to another header. The joints formed by the expanded end portions of the tubes and the pertinent tube seats may be considered as forming connections which afford adequate mechanical strength in that portion of the apparatus, for maintaining each tube in its proper operative position relative to the tube sheet and to adjoining tubes, irrespective of the stresses or strains incurred as a result of high operating pressures and temperatures, and irrespective of stresses or strains incurred as a result of welding by which each tube is additionally joined with its tube sheet. Such welds may be considered as formed in an annular recess or groove formed by a surface of the tube sheet and a part of the tube, and these welds are formed at the surface of the tube sheet opposite the tube sheet surface subjected generally to the higher fluid pressure. These welds are made for the purpose of preventing any substantial reduction of the operative high fluid pressure by reason of any substantial leakage through the completed tube and tube sheet connection, and in order that there may be assurance that the welds will prevent any substantial leakage of fluid from the high fluid pressure surface of the tube sheet this invention provides a pressure equalizing passage extending from that surface to an annular passage around each tube and behind its weld, thus permitting the high operative (or test) pressure to be immediately effective against the entire circumference of each weld. If there is any such substantial leakage, the defective weld metal is removed and a new weld is substituted.

In some embodiments of the invention the main part of each tube may extend through a pressure chamber exposed exteriorly to a high pressure fluid. When such apparatus is subjected to extremely high fluid pressure there are apt to be imperfections in the tube seat or imperfections in the tube expanded therein to form a pressure tight joint with the tube wall, with the result that there may be a minor leak, and consequently loss of pressure. To eliminate the possibility of loss of any substantial pressure under certain conditions, it is desirable to seal weld the end of the tube remote from the fluid pressure chamber, to the metal of the wall, or the tube seat metal. When such a seal weld is formed in apparatus subject in use to very high fluid pressures, these considerations make it important that the completeness of the seal should be unquestionably established before the apparatus is put into use.

This invention not only involves the above indicated procedures but it provides a structure and a method whereby the sealing effect of the seal weld may be adequately tested. To accomplish this result the invention involves the formation of one or more external longitudinal grooves in the tube, the grooves being of such extent that they will communicate pressure from the pressure chamber to the zone of the seal weld, and permit the pressure to be effective upon the weld throughout its entire annular extent. When a grooved tube is fitted within a tube seat so that the inner end of the groove is in communication with the pressure chamber and the outer end communicating with the zone of the seal weld, the grooved portion of the tube is then preferably expanded into tight relationship with the tube seat metal, with the end of the tube opposite the chamber preferably projecting slightly from the surface of the wall. Then weld metal is deposited in the annular groove formed by the tube and the wall for the purpose of providing a complete seal, or closure between those parts. As the annular seal weld metal cools it contracts toward the center of the annulus thus pulling the tube metal away from the tube seal metal in the zone of the weld to form an annular test chamber immediately behind the weld. This annular test chamber is in communication with the pressure chamber on the opposite side of the wall and, when the pressure chamber is subject to high fluid pressure, this pressure is communicated through the groove to the seal weld. Then, if there is any defect in the seal weld and there is an opening through which the pressurized fluid may escape, it will be at once apparent and the location of the defect will be determined in order that there may be rewelding at this point to establish the completeness of the pressure seal formed by the weld metal.

In one specific instance, the invention involves a cylindrical pressure vessel having very thick end walls in which a large number of tube seats are formed for the expanding therein of tubes which extend throughout the pressure chamber within the vessel. The tubes are fitted within such tube seats at opposite ends of the vessel, after the tubes have been grooved as above indicated. The tubes are then expanded into their tube seats and weld metal is deposited around each tube end and along the surface of the tube seat opposite its surface exposed to the pressure chamber. The seal welds are then allowed to cool so that the welds together with their pertinent tube ends contract to form an annular test space or chamber immediately adjacent or underneath each seal weld. The pressure vessel is then subjected to a high fluid pressure so that the fluid around the main portions of the tubes has such high pressure. Thereupon the high fluid pressure will be communicated through the test grooves to the seal welds and if the seal welds are so affected as to permit the escape of fluid pressure from the annular test chambers beneath the welds, the locations of the defects may be determined and the defects eliminated by re-welding.

The invention will be concisely set forth in the claims, but for a complete understanding of the invention and its use and advantages, recourse should be had to the accompanying description which refers to the drawing in which preferred embodiments of the invention are illustrated. Similar reference characters appear in the description and the drawings, for the purpose of clarity of the disclosure.

In the drawings:

Fig. 1 is a partial longitudinal section of the illustrative apparatus adapted in use to be subject to high fluid pressures;

Fig. 2 is a transverse section on the section line 2—2 of Fig. 1, showing, in particular, an intermediate tube support provided with openings in which the tubes are disposed in order that the spacing and arrangement of the tubes may be maintained within the pressure chamber;

Fig. 3 is a detail view showing, on an enlarged scale, the structure and arrangement at each of the tube seats in an end wall of the pressure vessel; and Fig. 4 is a transverse section through the longitudinal grooved tube on the line 4—4 of Fig. 3.

Fig. 1 of the drawings indicates a thick wall pressure vessel in the nature of a long hollow cylinder. It is preferably fabricated by the welding together of circular sections such as 10, in end-to-end relationship. It will be understood that there may be a large number of these sections, with a correspondingly large number of circumferential welds where the length of the pressure vessel is of such magnitude as to require such structure. At each end of the pressure vessel a thick wall closure, such as 16, is united to the adjoining section 10 by a circumferential weld 18. This end structure is in the nature of a tube sheet having a plurality of bores formed therein and arranged in predetermined spaced relationship which may be considered as indicated in Fig. 2. These bores form tube seats in which the ends of tubes 20 are to be inserted.

Prior to the insertion of the tubes in the tube seats each tube end has formed therein one or more longitudinal external grooves, such as indicated at 22 and 24, in Fig. 3. Preferably, the length of each groove is greater than the length of the tube seat 26 formed in the end member or closure 16, in order that the groove may communicate with the pressure chamber within the vessel. For the purpose of clarity, the size of this groove has been exaggerated in the drawing. To give a further idea as to the actual size of the groove, it may have a width of .005 to .008 inch and a depth of .002 inch in a fluid heat exchange apparatus involving tubes having a 2 inch O. D.

In disposing the tube ends within the tube seats, the tubes are threaded through the openings such as 30—33 in a tube support plate 36 disposed preferably midway of the length of the pressure vessel and held in operative position by the grooved inner ends of the metallic cylinders or rods 38, 40 and 42 which are disposed at 120° spacing over the transverse section of the pressure vessel and welded thereto as indicated at 44—46.

Preferably, the tubes are of such length that when they are disposed in operative relationship to the tube sheets, or end closure members 16, they project from the outer surface AB of each tube sheet as indicated at 50 in Fig. 3. Thus, there is formed a circular groove between the external surface of the tube end and the adjacent surface of the tube sheet. In this groove a complete ring 52 of weld metal is deposited for integrally uniting the tube metal and the tube sheet metal through the entire annulus, for forming a complete pressure seal.

After the weld metal is deposited around the tube ends to present a structure as indicated in Fig. 3, the weld metal cools and tends to shrink, forming an annular test space 54 entirely around and underneath each weld. With this arrangement, and with the groove 22 connecting the main pressure chamber 56 and the annular pressure space 54, the main pressure chamber is subjected to high fluid pressure, preferably much higher than the pressure to which the apparatus will be subjected in its intended use. Thereupon if there are such defects in the seal welds 52 as permit pressure leaks, the locations of such leaks are readily determined in order that the seal welds may be rewelded at these positions. The size of the annular pressure space 54 has been exaggerated in the drawing for the purpose of clarity, and it is to be understood that this annular space may be almost infinitesimally small in high pressure units.

Fig. 1 shows a backing up ring 60 which may be used in the deposition of the circumferential welds for uniting the sections of the illustrative pressure vessel. This figure also shows the supplemental end closure member 62 which may be united with the member 16 in pressure tight relationship to form a supplemental end chamber 64 in connection with the tubes 20 when the apparatus is used for different fluids or for different fluid pressures exteriorly of the tubes and internally thereof. This supplementary end member 62 has externally thereto circular bore 66 for appropriate closure, or other use.

To further describe the apparatus as shown in the drawing, the tube sheet having the ends of the tubes extending through its tube seats may be of a thickness in the range of four to ten inches and there may not only be a considerable pressure differential between opposite surfaces of the tube sheet, but there may also be a considerable temperature differential. As an example of the pressure differential, the particular apparatus shown in the drawings is subject to a design pressure of 500 p. s. i. in the pressure chamber 56, while the tubes 20 and their communicating header or end chamber 64 are subjected to a design pressure of 2500 p. s. i. In this case the tube sheet takes care of the pressure differential of the order of 2000 p. s. i.

Whereas the invention has been described with reference to the details of a preferred embodiment thereof, it is to be appreciated that the invention is not limited to all of the details described. It is rather to be taken as of a scope commensurate with the scope of the subjoined claims.

What is claimed is:

1. In a multiple tube fluid heat exchange apparatus adapted for operation at high pressures, a fluid pressure component having a wall serving as a tube sheet with one surface of the tube sheet subject to high fluid pressure much higher than the pressure to which the opposite surface of the tube sheet is subjected, said tube sheet having a plurality of cylindrical bores therethrough with each cylindrical bore formed therein for serving as a tube seat, a plurality of fluid heat exchange tubes with each tube having an end portion fitted within a tube seat and expanded therein for a mechanical strength connection between the tube sheet and the tube, and a ring weld for each tube joining a tube and the tube sheet surface opposite the surface of higher fluid pressure, at least one of the foregoing elements being formed so as to provide a pressure equalizing passage communicating freely with the fluid pressure at the higher pressure side of the tube sheet and extending to a space immediately behind the weld and on the side of the weld toward the higher pressure zone.

2. The method of fabricating means functioning at high fluid pressures and having a group of spaced tubes extending through tube seats in a thick metal wall and also having a pressure tight joint between each tube end and the metal of the wall, said means also including a high fluid pressure chamber around the tube, the method including the steps of forming a plurality of external longitudinal grooves along the portion of each tube to be disposed in a tube seat with each groove of a length corresponding substantially to the length of the tube seat, expanding the grooved portion of the tube tightly against the tube seat but not to such an extent to obstruct or close the groove, seal welding the end of the tube to the wall, subjecting the chamber to high fluid pressure to test the completeness of the seal formed by the weld, and rewelding any portion of a weld showing a leak.

3. The method of fabricating apparatus functioning at high fluid pressures and having a tube extending through a tube seat in a thick metal wall and also having an expanded tube connection with the metal of the wall, said apparatus also including a high fluid pressure chamber around the major portion of the tube, the method comprising the steps of forming an external longitudinal groove along the portion of the tube to be disposed in the tube seat and of such a length as to permit fluid pressure within the chamber to be communicated through the groove throughout substantially the full length of the tube seat, expanding the grooved portion of the tube in the tube seat, seal welding the end of the tube to the wall, and subjecting the chamber to high fluid pressure to test the completeness of the seal formed by the weld.

4. In apparatus adapted for use at high fluid pressures, a pressure vessel having a wall constituting a tube sheet with a bore therethrough forming a tube seat, a tube having an end tube seat portion disposed within the tube seat and having a longitudinal and external groove formed in the tube seat portion throughout the major part of the length of the tube seat portion, the pressure vessel being formed so as to provide a pressure chamber through which the tube extends, the pressure chamber being disposed at one side of the pressure vessel wall, the channel or groove being open to communication with the pressure chamber and extending at least as far as a position near the surface of the tube sheet opposite the pressure chamber, and an annular seal weld uniting the end of the tube and the adjacent tube sheet metal, the groove or channel extending to the inner surface of the seal weld.

5. The combination of claim 4 further characterized by an annular chamber immediately beneath and behind the seal weld and extending around the tube at that position, the longitudinal groove connecting with said annular chamber.

6. The method of fabricating fluid heat exchange apparatus functioning at high fluid pressures and having a tube extending through a tube seat in a thick metal wall and also having a strength connection with the metal of the wall effected by expanding the tube within the tube seat, said apparatus also including a high fluid pressure chamber around the main portion of the tube, the method comprising the steps of forming an external longitudinal groove along the portion of the tube to be disposed in the tube seat and of such length as to permit fluid pressure within the chamber to be communicated through the groove throughout substantially the full length of the tube seat, expanding the grooved portion of the tube in the tube seat, seal welding the end of the tube to the wall, subjecting the chamber to high fluid pressure to determine the location of any leaks through the seal weld, and rewelding any portions of the weld showing such a leak.

7. The method of fabricating fluid heat exchange apparatus functioning at high fluid pressures and having a tube extending through a tube seat in a thick metal wall and also having a pressure tight tube expanded connection with the metal of the wall, said apparatus also including a high fluid pressure chamber around the tube, the method comprising the steps of forming an external longitudinal groove along the portion of the tube to be disposed in the tube seat of such length as to permit fluid pressure within the chamber to be communicated through the groove to the full length of the tube seat, expanding the grooved portion of the tube in the tube seat, seal welding the end of the tube to the wall, subjecting the chamber to high fluid pressure to test the completeness of the seal formed by the weld and determine the location of any leaks through the seal weld, and rewelding any portion or portions showing such a leak.

8. The method of fabricating means functioning at high fluid pressures and having a plurality of tubes with each tube extending through a tube seat in a thick metal wall and also having a circular weld joint between the tube end and the metal of the wall, said means also including a high fluid pressure chamber around the tube, the method including the steps of forming a plurality of external longitudinal grooves along the portion of each tube to be disposed in a tube seat with each groove of a length corresponding substantially to the length of the tube seat, fitting the tubes successively within the pertinent tube seats, expanding the grooved portion of the tube tightly against the tube seat but not sufficiently to obstruct or close a groove, seal welding the end of the tube to the wall, cooling each weld to develop therebeneath an annular test chamber communicating with each of the grooves, subjecting the chamber to high fluid pressure to test the completeness of the seal formed by the weld, and rewelding any portion of a weld showing a leak.

9. The method of fabricating fluid heat exchange apparatus functioning at high fluid pressures and having a plurality of tubes with each tube extending through a tube seat in a thick metal wall, said means also including a high fluid pressure chamber around the tube, the method including the steps of forming a plurality of external longitudinal grooves along the portion of each tube to be disposed in a tube seat with each groove of a length corresponding substantially to the length of the tube seat, fitting the tubes successively within the pertinent tube seats, expanding the grooved portion of the tube tightly against the tube seat but not sufficiently to obstruct or close any groove, seal welding the end of each tube to the wall, cooling each weld to develop therebeneath an annular test chamber communicating with each groove of the pertinent tube, subjecting the chamber to high fluid pressure to test the completeness of the seal formed by the weld, and rewelding any portion of a weld showing a leak.

10. In apparatus adapted for use at high fluid pressures, a pressure vessel having a wall with a multiplicity of bores therethrough forming tube seats, a plurality of tubes each having an end tube seat portion disposed within a tube seat and having a plurality of longitudinal and external grooves formed in each tube seat portion throughout at least the major portion of the length of the tube seat portion, the pressure vessel being formed so as to provide a pressure chamber through which the tubes extend, the channels or grooves being open to communication with the pressure chamber, and an annular seal weld uniting the end of each tube and the adjacent tube sheet metal, the grooves or channels extending at least to a position near the inner surface of the seal welds.

11. The combination of claim 10 further characterized by an annular chamber immediately beneath and behind the seal weld and extending circumferentially around the tube at that position, the longitudinal grooves connecting with said annular chamber.

12. In fluid heat exchange apparatus adapted for use at high fluid pressures, a pressure vessel having a wall constituting a tube sheet and having a plurality of bores therethrough forming tube seats, a plurality of tubes each having an end tube seat portion disposed within a tube seat and having a plurality of longitudinal and external grooves formed in each tube seat portion throughout at least the major portion of the length of the tube seat portion, the pressure vessel being formed so as to provide a pressure chamber through which the tubes extend, the channels or grooves being open to communication with the pressure chamber and extending to a position near the surface of the tube sheet opposite the pressure chamber, and annular seal welds each uniting the end of a tube and the adjacent tube sheet metal.

13. The combination of claim 12 further characterized by an annular chamber immediately beneath and behind the seal weld and extending around the tube at that position, the longitudinal groove connecting with said annular chamber.

14. In a fluid heat exchange apparatus adapted for operation at high pressures, a fluid pressure chamber having a wall serving as a tube sheet with one of its surfaces subject to high fluid pressure much higher than the pressure to which the opposite surface of the tube sheet is subjected, said tube sheet having a multiplicity of cylindrical bores formed therein each serving as a tube seat, a fluid heat exchange tube having an end portion fitted within each tube seat and expanded therein for a mechanical strength connection between the tube sheet and the tube, and a ring weld joining each tube and the tube sheet surface opposite the surface of higher fluid pressure, each tube being formed with a pressure equalizing passage communicating freely with the fluid pressure at the higher pressure side of the tube sheet and extending through the tube and tube sheet connection to a space immediately behind the weld.

15. In a fluid heat exchange apparatus adapted for operation at high pressures, pressure vessel means forming a fluid pressure chamber having a wall serving as a tube sheet with one of its surfaces subject to high fluid pressure much higher than the pressure to which the opposite surface of the tube sheet is subjected, said wall having a multiplicity of cylindrical bores formed therein each serving as a tube seat, a plurality of fluid heat exchange tubes the main parts of which are disposed within the chamber, each of said tubes having an end portion fitted within a tube seat and expanded therein for a mechanical strength connection between the tube sheet and the tube, and a plurality of ring welds each joining a tube and the tube sheet surface remote from said chamber, each tube being formed with a pressure equalizing passage communicating freely with the fluid pressure chamber at the higher pressure side of the tube sheet and extending through the tube and tube sheet connection to a space immediately behind the weld.

16. In plural tube fluid heating apparatus adapted for operation at high pressures, a fluid pressure component having a wall serving as a tube sheet with one surface of the tube sheet subject to a fluid pressure much higher than the pressure to which the opposite surface of the tube sheet is subjected, the tube sheet having a plurality of cylindrical bores thereto with each bore formed therein for serving as a tube seat, a plurality of fluid heat exchange tubes with each tube having an end portion fitted within a tube seat and expanded therein, and a ring weld for each tube joining the tube and the surface of the tube sheet opposite its surface subjected to the higher fluid pressure, at least one of the foregoing elements being formed so as to provide a pressure equalizing passage communicating freely with the fluid pressure at the higher pressure side of the tube sheet and extending to a space immediately behind the weld and at the side of the weld toward the higher pressure zone.

References Cited in the file of this patent

UNITED STATES PATENTS

| | | |
|---|---|---|
| 1,977,987 | Corby | Oct. 23, 1934 |
| 2,252,274 | Rossheim et al. | Aug. 12, 1941 |
| 2,350,867 | Bean et al. | June 6, 1944 |